US012637296B2

(12) United States Patent
Koenig

(10) Patent No.: US 12,637,296 B2
(45) Date of Patent: May 26, 2026

(54) SYSTEM AND METHOD FOR SUPPRESSION OF SMOKE AND/OR FIRE IN AN AUGER SYSTEM

(71) Applicant: Komar Industries, LLC, Groveport, OH (US)

(72) Inventor: Mark E. Koenig, Carroll, OH (US)

(73) Assignee: Komar Industries. LLC, Groveport, OH (US)

( * ) Notice: Subject to any disclaimer, the term of this patent is extended or adjusted under 35 U.S.C. 154(b) by 0 days.

(21) Appl. No.: 17/880,965

(22) Filed: Aug. 4, 2022

(65) Prior Publication Data

US 2023/0038086 A1 Feb. 9, 2023

Related U.S. Application Data

(60) Provisional application No. 63/229,176, filed on Aug. 4, 2021.

(51) Int. Cl.
  *B65G 33/26* (2006.01)
  *B65G 11/20* (2006.01)
(52) U.S. Cl.
  CPC .............. *B65G 33/26* (2013.01); *B65G 11/20* (2013.01)
(58) Field of Classification Search
  None
  See application file for complete search history.

(56) References Cited

U.S. PATENT DOCUMENTS

| | | | | | |
|---|---|---|---|---|---|
| 4,664,170 | A | * | 5/1987 | Labelle | E06B 9/78 160/133 |
| 4,819,378 | A | * | 4/1989 | Ando | E06B 7/18 49/225 |
| 5,022,328 | A | * | 6/1991 | Robertson | F23G 5/033 241/31 |
| 5,355,927 | A | * | 10/1994 | McKeon | E06B 9/82 160/310 |
| 6,752,337 | B2 | * | 6/2004 | Koenig | B09B 3/20 241/23 |
| 8,100,066 | B2 | * | 1/2012 | Stein | F23G 5/444 110/109 |
| 9,133,663 | B2 | * | 9/2015 | Klish | A62C 2/10 |
| 9,278,814 | B2 | * | 3/2016 | Koenig | B65G 37/00 |
| 10,072,223 | B2 | * | 9/2018 | Koenig | B65G 37/00 |

OTHER PUBLICATIONS

Overhead Door, Fire-Rated Service Doors 630 and Fire-Rated Doors, https://www.overheaddoor.com, retrieved Dec. 14, 2020, 6 pages.

* cited by examiner

*Primary Examiner* — William R Harp
(74) *Attorney, Agent, or Firm* — Standley Law Group LLP; Jeffrey C. Norris; Bryan P. Finneran

(57) ABSTRACT

An auger system and method that comprises at least one auger. The auger(s) are situated in a processing chamber that is adapted to receive material to be processed by the auger(s). A hopper or chute is associated with the processing chamber in order to direct material into the processing chamber to be processed by the auger(s). The hopper or chute comprises at least one door that is adapted to move into a position to assist with suppression and/or containment of smoke and/or fire that may emanate at any time in such material (e.g., before, during, or after processing of the material by the auger(s)).

20 Claims, 14 Drawing Sheets

SECTION A-A

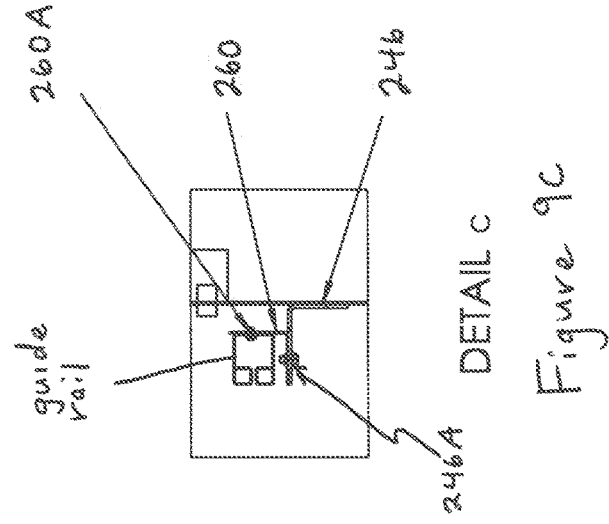
DETAIL c
Figure 9c
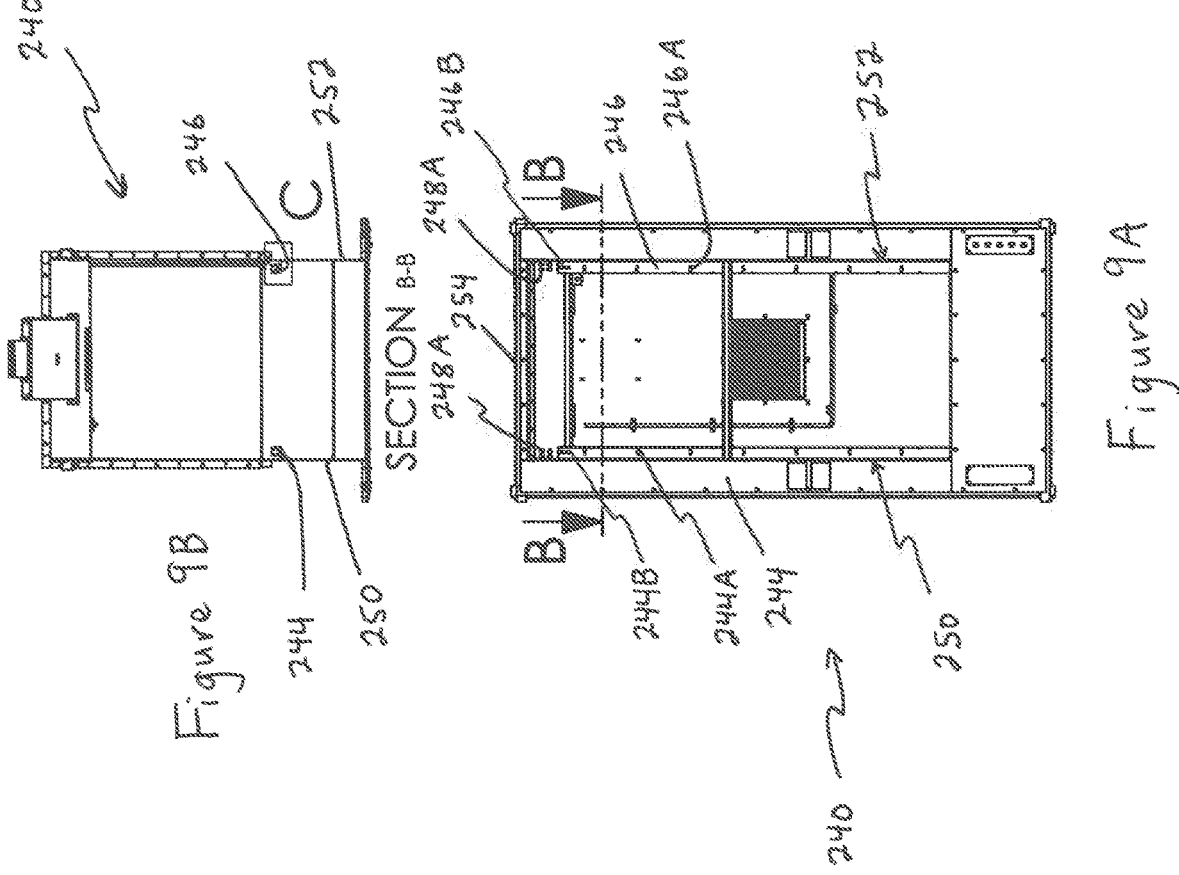
Figure 9B
SECTION B-B
Figure 9A

Smoke curtain housing

Smoke curtain guide rail

SECTION D-D

DETAIL F

SECTION E-E

Smoke curtain housing

1

SYSTEM AND METHOD FOR SUPPRESSION OF SMOKE AND/OR FIRE IN AN AUGER SYSTEM

This application claims the priority benefit of U.S. Provisional Application No. 63/229,176, filed Aug. 4, 2021, which is hereby incorporated by reference in its entirety.

BACKGROUND AND SUMMARY OF THE INVENTION

Exemplary embodiments of the present invention relate generally to smoke and fire suppression.

There is a risk of fire when processing waste material. In particular, a variety of flammable or combustible waste materials end up in the trash. In addition, businesses such as, but not limited to, warehouses, fulfillment and distribution centers, packaging centers, restaurants, etc. frequently remove flammable or combustible waste materials from their respective facilities. In any event, excess heat before or during processing of the waste materials may lead to spontaneous ignition. However, particularly during processing, a fuel source or accelerant (e.g., batteries, butane lighters, fuels, etc.) may be mixed in with a waste stream. Processing may lead to ignition of the fuel source or accelerant, which may quickly ignite any other flammable or combustible material in the waste stream. For instance, paper goods, cardboard, corrugated goods, wood, etc. may quickly ignite and increase the spread and damage of a fire.

Due to fire or transportation concerns, waste processing systems are often at least partially situated outside of a facility that is disposing of its waste. For example, an auger processing system may have an auger or multiple augers situated on or near the outside of a facility such that the auger(s) may efficiently be fed with waste from inside of the facility. As a result, there may be an air passage to the facility such as through which waste may be fed to the auger(s). If a fire occurs, a significant amount of fire and smoke may fill a hopper or chute that directs the waste material to the augers. The smoke and possibly also fire may then progress through the air passage to the facility, which causes the facility to need to be evacuated. Ultimately, the lack of man power and the shutdown of equipment is extremely costly for the facility.

In view of the shortcomings of the known art, there is a need to be able to suppress smoke and/or fire in a waste processing system or method, most particularly an auger processing system or method. There is also a need to be able to prevent or reduce the amount of smoke and/or fire that is able to enter a facility from a waste processing system that is situated outside of the facility. A need also exists to be able to substantially close an opening to a facility such as through which waste may be fed to an auger system. Finally, a need exists for an auger system and method in which a wall of a hopper or input chute of the auger system is movable between an open position and a closed position in order to be able to assist with containment of smoke and/or fire that may emanate in material that is being processed in the auger system. Other types of waste processing systems having a hopper or input chute also have a need for a wall having such functionality.

An exemplary embodiment of the present invention may satisfy at least one of the aforementioned needs. One exemplary embodiment may be an auger system that comprises at least one auger. The auger(s) are situated in a processing chamber that is adapted to receive material to be processed by the auger(s). A hopper or chute is associated with the processing chamber in order to direct material into the processing chamber to be processed by the auger(s). In an exemplary embodiment, at least one door (which may also be referred to as a wall or curtain herein) of the hopper or chute is adapted to move into a position to assist with suppression and/or containment of smoke and/or fire that may emanate at any time in such material (e.g., before, during, or after processing of the material by the auger(s)).

An exemplary embodiment also includes a related method for containment of smoke and/or fire that may emanate in material that is being processed in an auger system. In an exemplary method, an auger system is provided that comprises at least one auger. The auger(s) are situated in a processing chamber that is adapted to receive material to be processed by the auger(s). A hopper or chute is associated with the processing chamber in order to direct material into the processing chamber to be processed by the auger(s), wherein at least one door of the hopper or chute is adapted to move into a position to assist with containment of smoke and/or fire that may emanate in material that is being processed in the auger system. In an exemplary method, the at least one door is adapted to be in an open position to allow for receipt of material into the processing chamber to be processed by the auger(s). After receipt of material, the at least one door is adapted to move into a closed position to assist with suppression and/or containment of smoke and/or fire that may emanate in the received material at any time (e.g., before, during, or after processing of the material by the auger(s)).

While exemplary embodiments may be particularly beneficial for auger systems and methods, exemplary embodiments may also be implemented in other types of processing systems that do not comprise an auger. In particular, exemplary embodiments may be similarly implemented with respect to any type of processing system and method (e.g., a ram system and method) wherein there is at least one door as described herein. While such other processing systems and methods may comprise a processing chamber into which material is directed to be processed, some other exemplary embodiments may not have a processing chamber. In any of the aforementioned embodiments, the at least one door may similarly assist with suppression and/or containment of smoke and/or fire that may emanate in the received material at any time (e.g., before, during, or after processing of the material by the processing system).

In addition to the novel features and advantages mentioned above, other benefits will be readily apparent from the following descriptions of the drawings and exemplary embodiments.

BRIEF DESCRIPTION OF THE DRAWINGS

FIG. 9A is another front elevation view of the hopper of FIG. 8A, wherein a section line B-B is shown, and a sample pipe and a hopper filler panel are also shown in association with the hopper.

FIG. 9B is a cross-section view of the hopper of FIG. 9A along line B-B, wherein a Detail C is identified. A guide rail for a fire curtain or other type of door is also shown to provide an example installation.

FIG. 9C is Detail C from FIG. 9B.

DETAILED DESCRIPTION OF EXEMPLARY EMBODIMENT(S)

Exemplary embodiments of the present invention are directed to systems and methods for suppression of smoke and/or fire in a material processing system.

Figure 1:
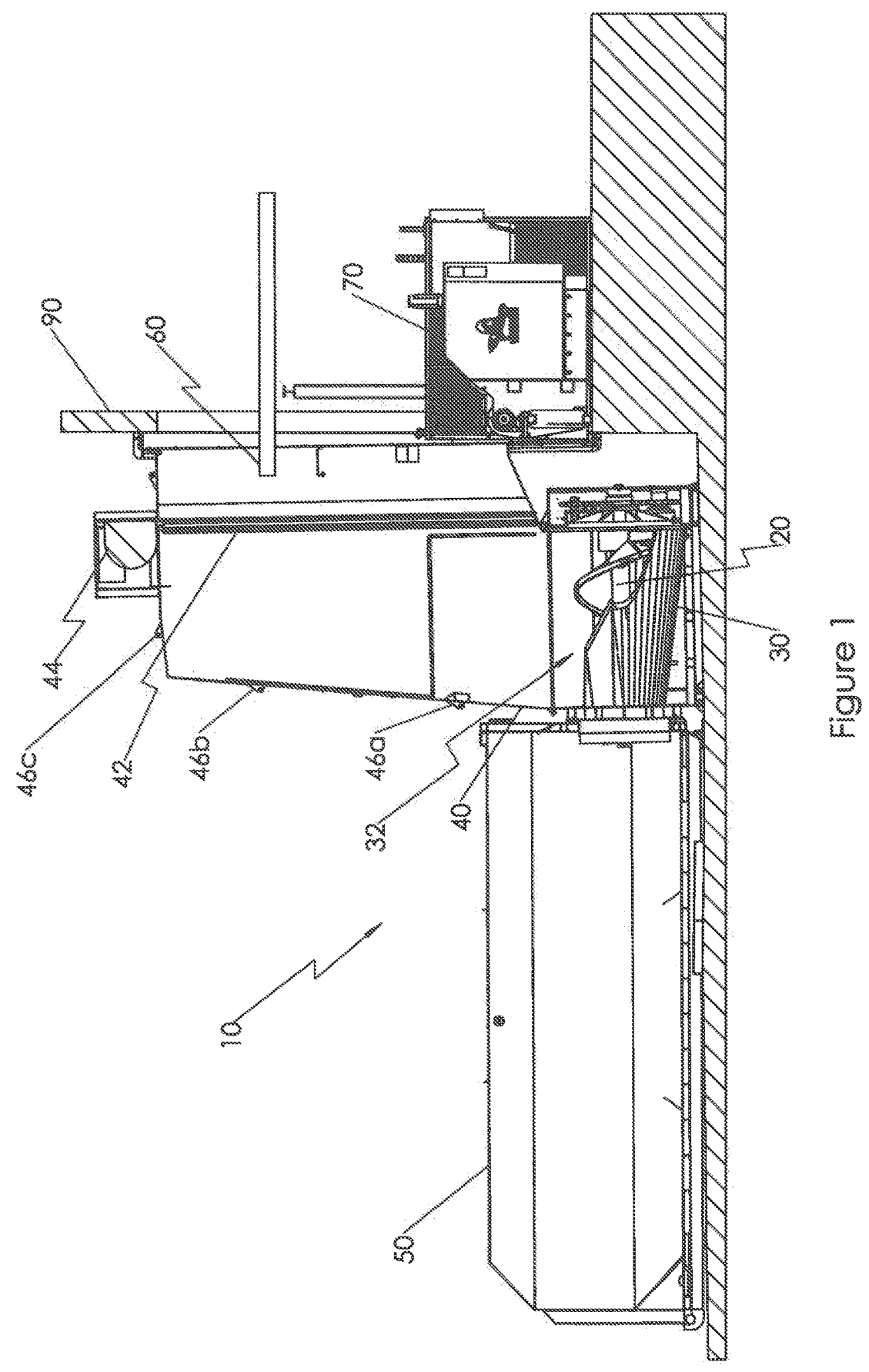
FIG. 1 is a sectional, side elevation view of an exemplary embodiment of an auger system of the present invention.
Figure 2A:
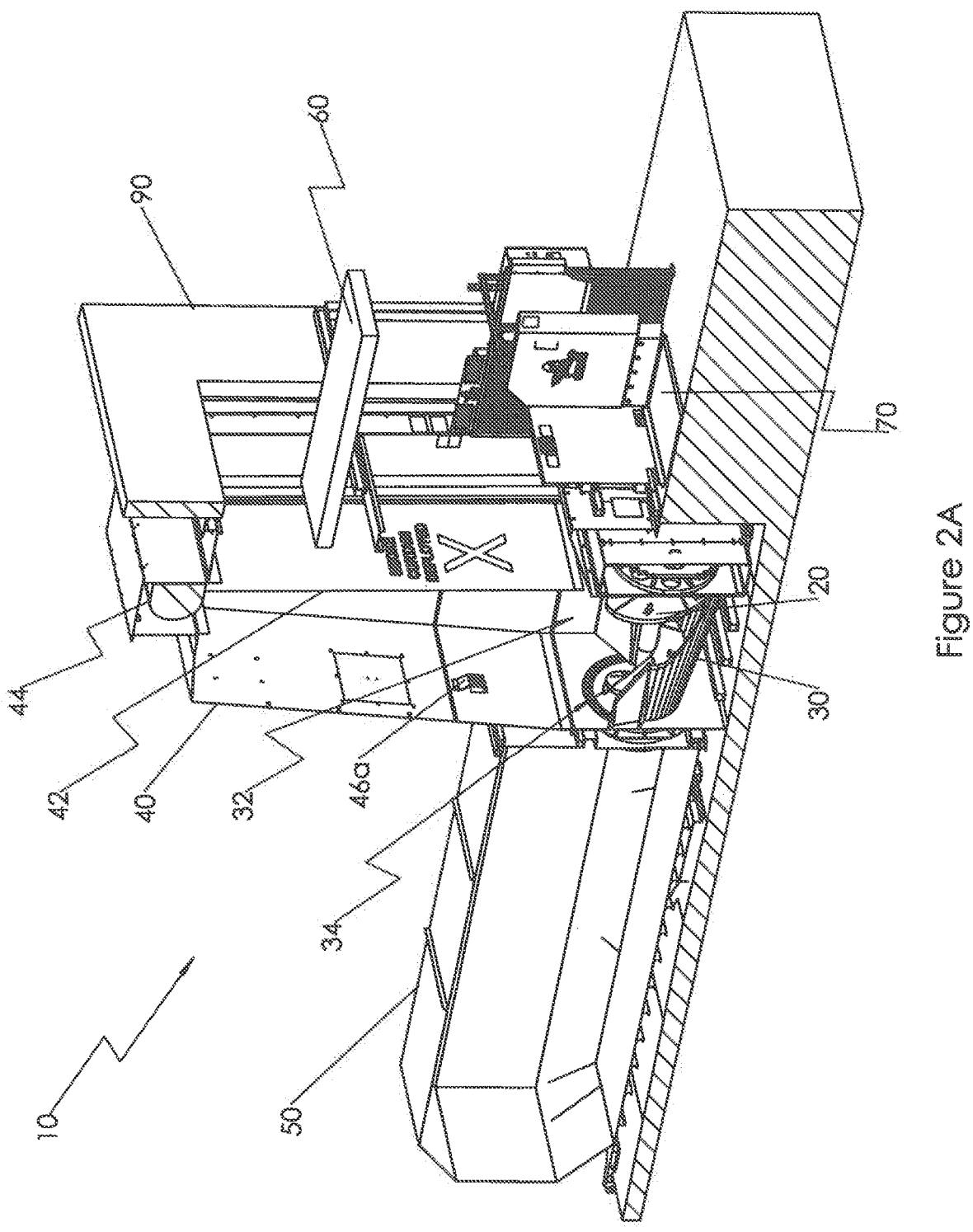
FIG. 2A is a sectional, perspective view of the auger system of FIG. 1.
Figure 2B:
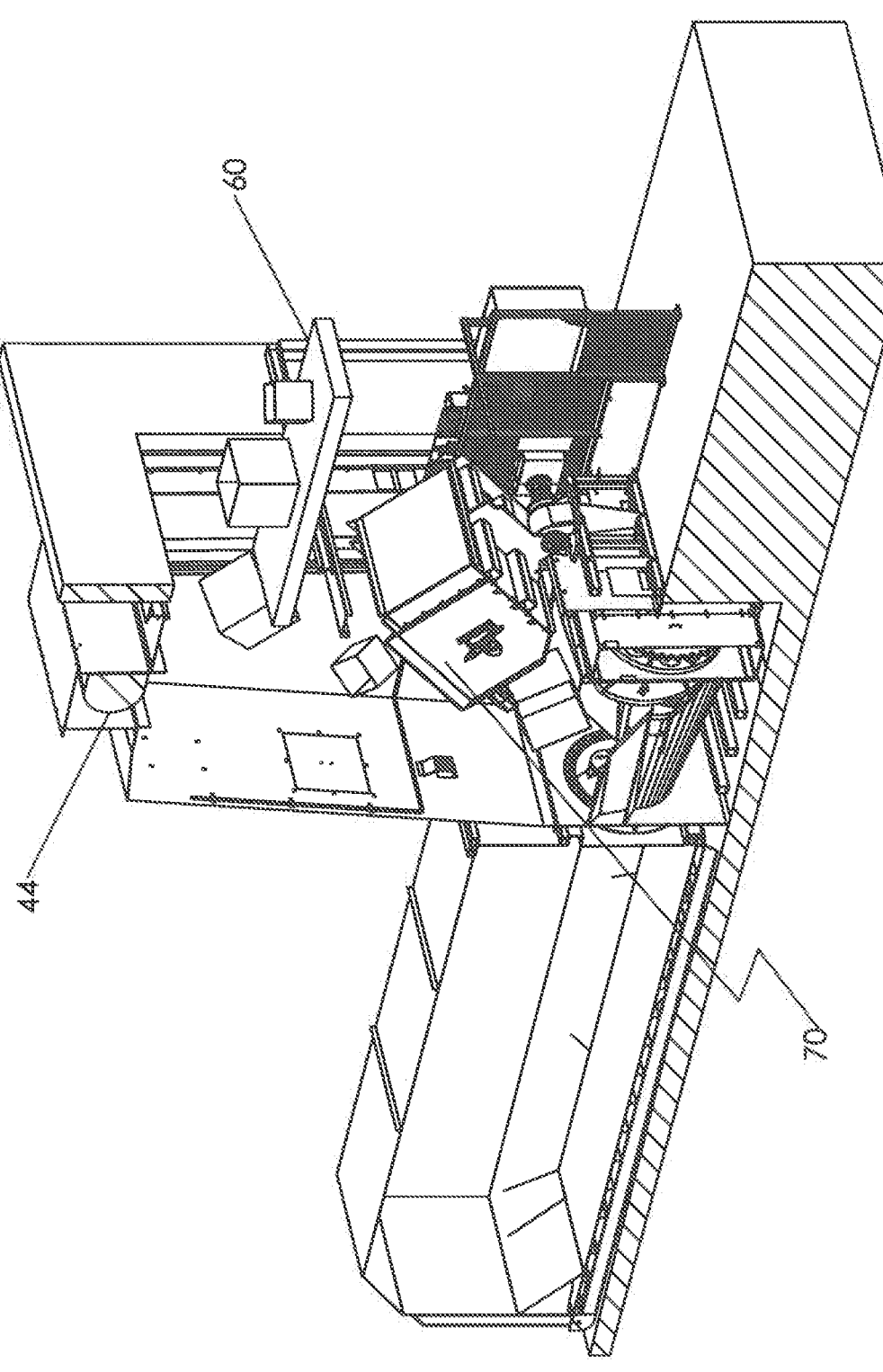
FIG. 2B is a sectional, perspective view of the auger system of FIG. 1 in the process of receiving waste material for processing.
Figure 3:
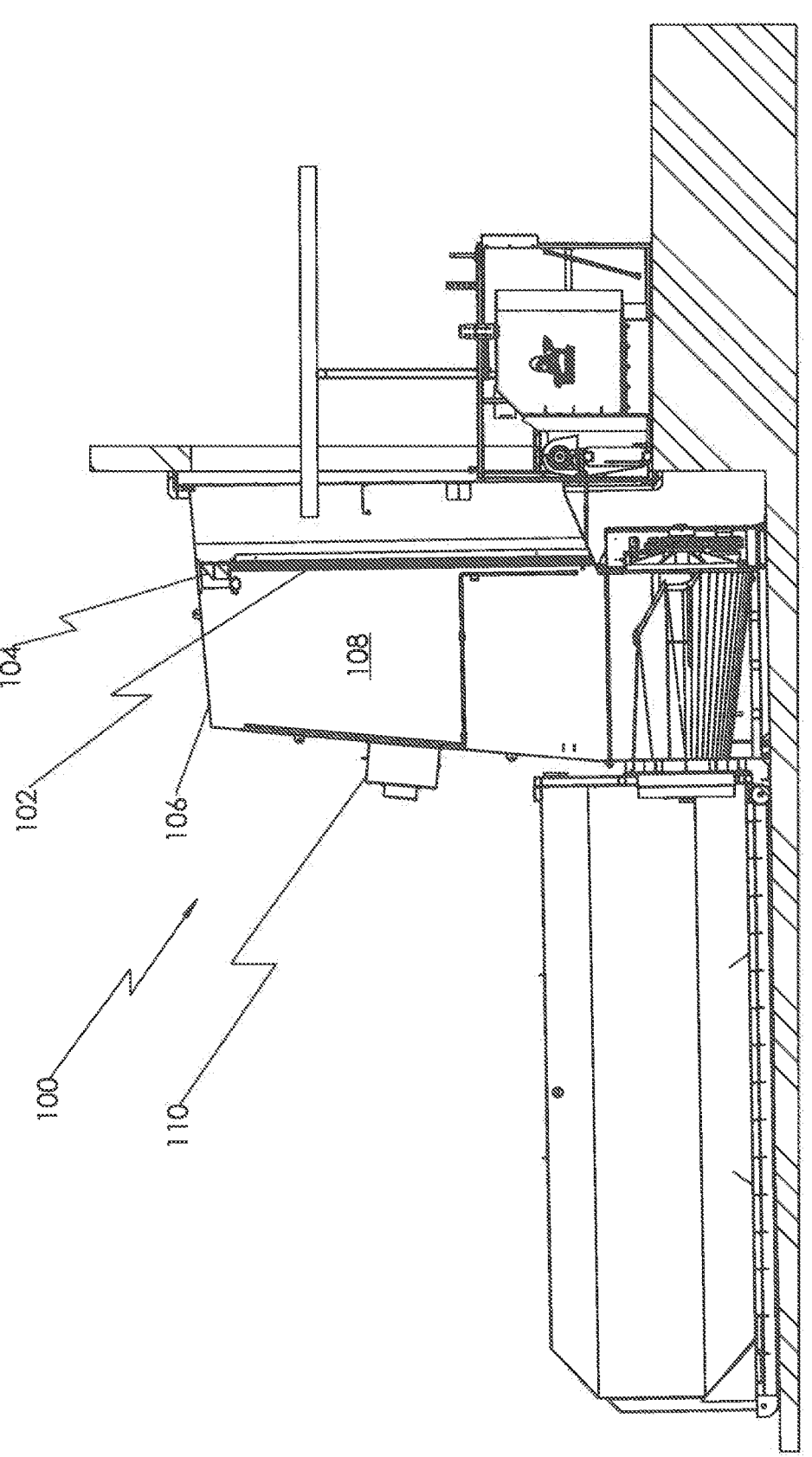
FIG. 3 is a sectional, side elevation view of another exemplary embodiment of an auger system of the present invention.
Figure 4A:
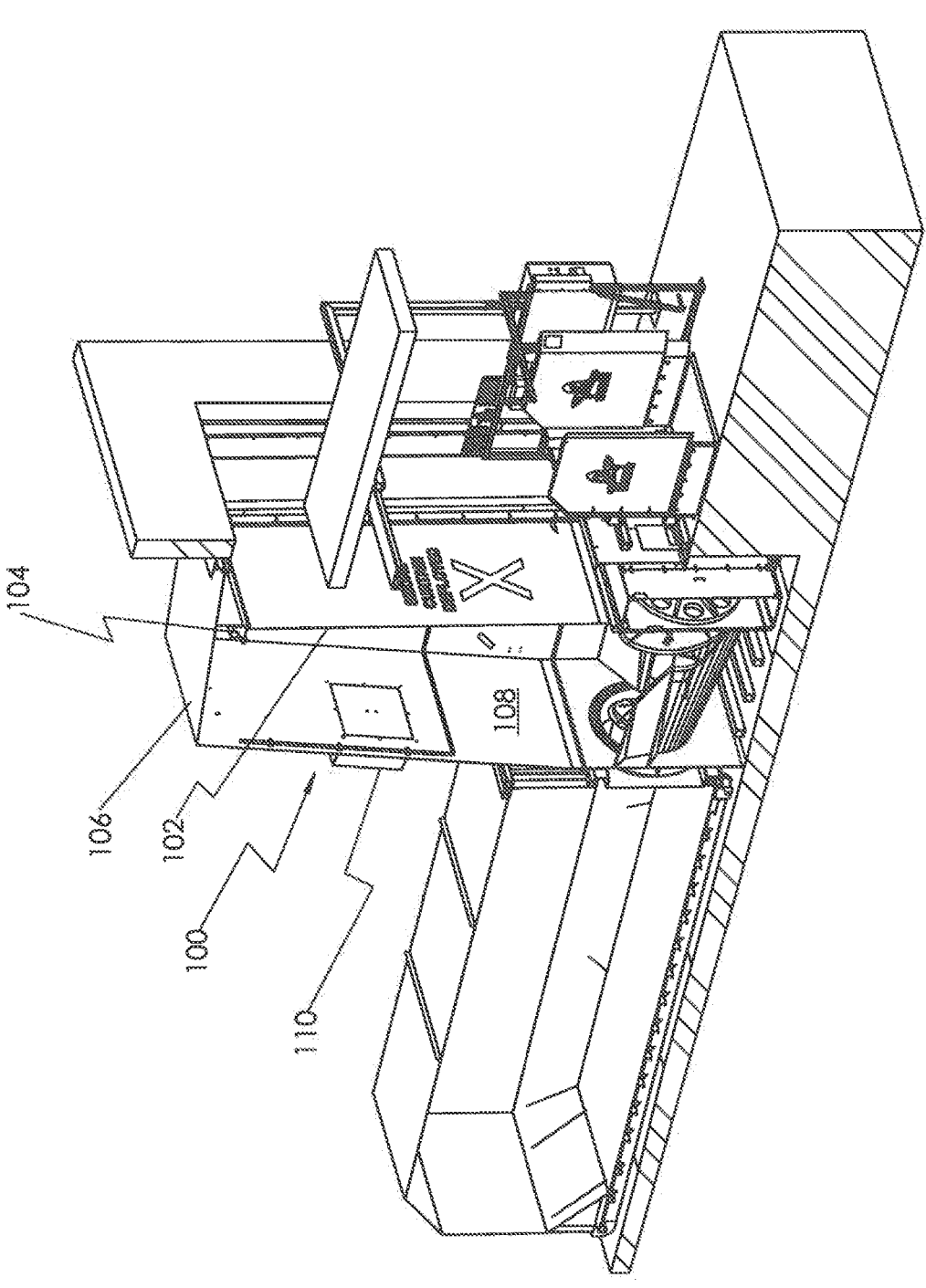
FIG. 4A is a sectional, perspective view of the auger system of FIG. 3.
Figure 4B:
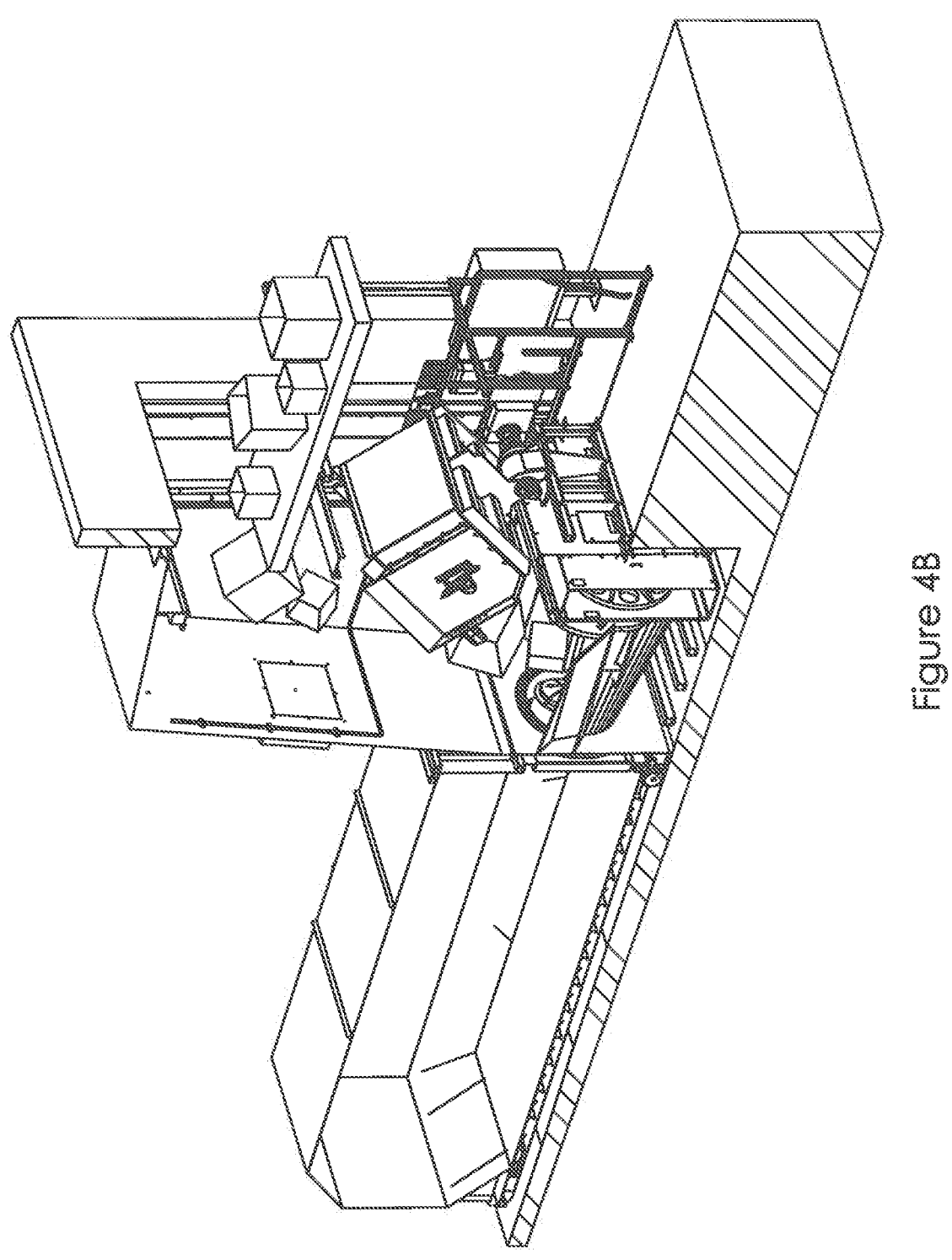
FIG. 4B is a sectional, perspective view of the auger system of FIG. 3 in the process of receiving waste material for processing.

As noted above, exemplary embodiments may be particularly beneficial for auger processing systems and methods. FIGS. 1, 2A, and 2B show an exemplary embodiment of an auger system 10 that is adapted to suppress smoke and/or fire. Auger system 10 is comprised of at least one auger 20 that is situated in a processing chamber 30. In this example, at least one auger 20 is cantilevered, which is highly preferred for processing material. However, in other exemplary embodiments, an auger or any other type of processing mechanism (e.g., a ram) may not be cantilevered and still similarly benefit from exemplary embodiments of the present invention. Also, in some other exemplary embodiments, a processing mechanism may not be situated in a processing chamber.

In this exemplary embodiment, processing chamber 30 at least partially defines an opening 32 in which material may be received in order to be processed by at least one auger 20. In particular, material may be introduced into hopper or chute 40, which then directs the material to opening 32 of processing chamber 30. In this example, at least one auger 20, which is situated in opening 32, may then proceed to process (e.g., transfer, compact, shred, and/or grind, etc.) the material and urge or otherwise allow the material to flow through a discharge opening 34 of processing chamber 30.

In this example, discharge opening 34 is in a side of processing chamber 30. However, in other exemplary embodiments, a discharge opening may be situated in any suitable portion of a processing chamber, including, but not limited to, a bottom of a processing chamber. Finally, in this example, a roll off container 50 receives the processed material that flows though discharge opening 34. Other exemplary embodiments may have a different type of container or other receptacle (e.g., a trailer, conveyor, etc.), or some embodiments may not include a container or other receptacle.

In order to assist with suppression of smoke and/or fire, hopper or chute 40 includes at least one door 42 that is adapted to move between an open position and a closed position. FIG. 2B shows door 42 in an open position for receiving material (e.g., boxes in this example). In an open position, this embodiment of door 42 may be retracted into a base 44. In other exemplary embodiments, a door may not retract into a base (e.g., a door may retract along a rail, etc.). When in an open position, material (e.g., boxes, crates, cans, random trash, etc.) may be introduced into hopper or chute 40 to be processed by at least one auger 20. In an exemplary embodiment, material may be introduced into hopper or chute 40 in any suitable manner(s) (e.g., such as via conveyor or platform 60, tipper or lift 70, forklift (not shown), and/or manually, etc.).

At least one door 42 is adapted to move from an open position to a closed position for smoke and/or fire suppression. In a closed position such as shown in the example of FIGS. 1 and 2A, at least one door 42 may be connected or otherwise be associated with processing chamber 30 such that it may assist with suppression and/or containment of smoke and/or fire that may emanate at any time in material that has been introduced into hopper or chute 40 (e.g., before, during, or after processing of the material by the auger(s)). For example, while in a closed position, at least one door 42 may suppress smoke and/or fire from flowing back through an opening in a facility 90 from which material may be introduced into hopper or chute 40. As a result, an exemplary embodiment may prevent or at least lessen the need to evacuate a facility when smoke and/or fire emanates in material that has been introduced into hopper or chute 40.

As aforementioned, in an exemplary embodiment, at least one door 42 may assist with containment (not necessarily airtight) of smoke and/or fire. For example, at least one door 42 may substantially enclose hopper or chute 40 (except opening 32) when in a closed position. More particularly, in an exemplary embodiment, at least one door 42 may be connected or otherwise associated with a remaining portion of hopper or chute 40 in order to substantially enclose hopper or chute 40 (except for opening 32). As a result, when at least one door 42 is in a closed position when there is a smoke or fire incident in hopper or chute 40, hopper or chute 40, alone or in combination with processing chamber 30 and container 50, may suppress and substantially contain such smoke and/or fire in order to prevent or lessen the amount of amount of smoke and/or fire that may spread back into facility 90, particularly back through an opening in facility 90 from which material may be introduced into hopper or chute 40. However, in some exemplary embodiments, a door in a closed position may not completely suppress and/or contain smoke and/or fire (e.g., a closed door may slow and/or limit a spread of smoke and/or fire).

At least one door 42 may be adapted to manually or automatically move from an open position to a closed position. For example, at least one door 42 may be manually or automatically moved into a closed position after a certain amount of material has been introduced into hopper or chute 40. As another example, at least one door 42 may be manually or automatically moved into a closed position when there is a smoke or fire incident in hopper or chute 40 and/or processing chamber 30. For instance, in one exemplary embodiment, gravitational pull may automatically move at least one door 42 to a closed position when there is a smoke or fire incident and/or when there is a certain amount of material in hopper or chute 40. However, other types of manual or automatic movement are possible.

In order to facilitate movement and/or indicate a need for movement, at least one type and number of sensor (e.g., UV/IR sensors, smoke detectors, thermocouples, etc.) may be situated in or otherwise associated with hopper or chute 40 and/or processing chamber 30 in order to detect a smoke or fire incident, which may then initiate movement of at least one door 42 to a closed position. In such an exemplary embodiment, the sensor(s) may also provide a signal to actuate visual and/or audible alarm(s) to alert employees or other individuals of the incident, who may potentially also start a controlled shutdown sequence to ensure the path to a closed position for at least one door 42 is clear. FIGS. 1, 2A, and 2B show one example of the use of multiple sensors 46a, 46b, and 46c in association with hopper or chute 40 in order to detect a smoke or fire incident. Various other positions of at least one sensor are possible in order to detect a smoke or fire incident in hopper or chute 40 and/or processing chamber 30. Also, in some other exemplary embodiments, at least one sensor or other device or system for determining an amount of material in a hopper or chute may be used in association with at least one door to assist with control of movement.

Other configurations of a door for a hopper or chute are possible. In one variation, a door may be configured such that it moves between an open position and a closed position in an opposite direction as compared to at least one door 42 of FIGS. 1, 2A, and 2B. In other words, for example, a door may move up from an open position at the processing chamber to a closed position where it connects or is otherwise associated with a top portion of a hopper or chute. In another exemplary embodiment, there may be multiple doors. In one such example, a first door may be mounted to a facility or an upper or other portion of a hopper or chute in order to be able to close down on a conveyor or platform from which material is delivered, and a second door may be mounted below the conveyor or platform in order to be able to close down on the processing chamber. In yet another exemplary embodiment, there may be a drop section of a conveyor or platform from which material is delivered to a hopper or chute. In the event of a smoke or fire incident, a door, which may be mounted to the facility or an upper or other portion of the hopper or chute, may close down through the drop section of the conveyor or platform and then connect or otherwise be associated with a processing chamber. Furthermore, in one other embodiment, a door in a closed position may be at an angle other than 90-degrees (e.g., such as to connect to a facility or an angled wall of a hopper or chute). In any of these exemplary embodiments, the operation, features, and advantages may otherwise be similar to system 10 of FIGS. 1, 2A, and 2B.

In any exemplary embodiment, a door may be comprised of any suitable material for suppressing smoke and/or fire. In one exemplary embodiment, a door may be a slat-type, metal fire wall/door. In other exemplary embodiments, a cloth or fiber smoke wall/door may be used. Other suitable materials are also possible for a door.

Also, with respect to any exemplary embodiment, a door may be incorporated as part of a new assembly or may be retrofitted.

FIGS. 3, 4A, 4B, 5A, and 5B show another exemplary embodiment of an auger system 100. In this exemplary embodiment, the door is a smoke curtain 102. Smoke curtain 102 is adapted to retract into a base 104 for an open position, wherein the base 104 may be mounted or otherwise integrated within a standard hopper or chute configuration. More particularly, base 104 is mounted inside or otherwise connected to an inside of a top 106 of the hopper or chute. In this exemplary embodiment, by fully integrating smoke curtain 102 and base 104 within the hopper, it may provide advantages such as being easier to install; easier to seal or otherwise associate with the top 106 and lateral sides 108 of the hopper; and a desirable production solution for many hopper or chute configurations and installations sites. However, in other exemplary embodiments, a base may be positioned in a suitable location elsewhere inside or outside of a hopper or chute such as may be desirable for a particular use or environment. This exemplary embodiment also includes a sensing system 110 to assist with detection of a smoke or fire incident. Auger system 100 may otherwise be and operate similarly to system 10 of FIGS. 1, 2A, and 2B.

Figure 5A:
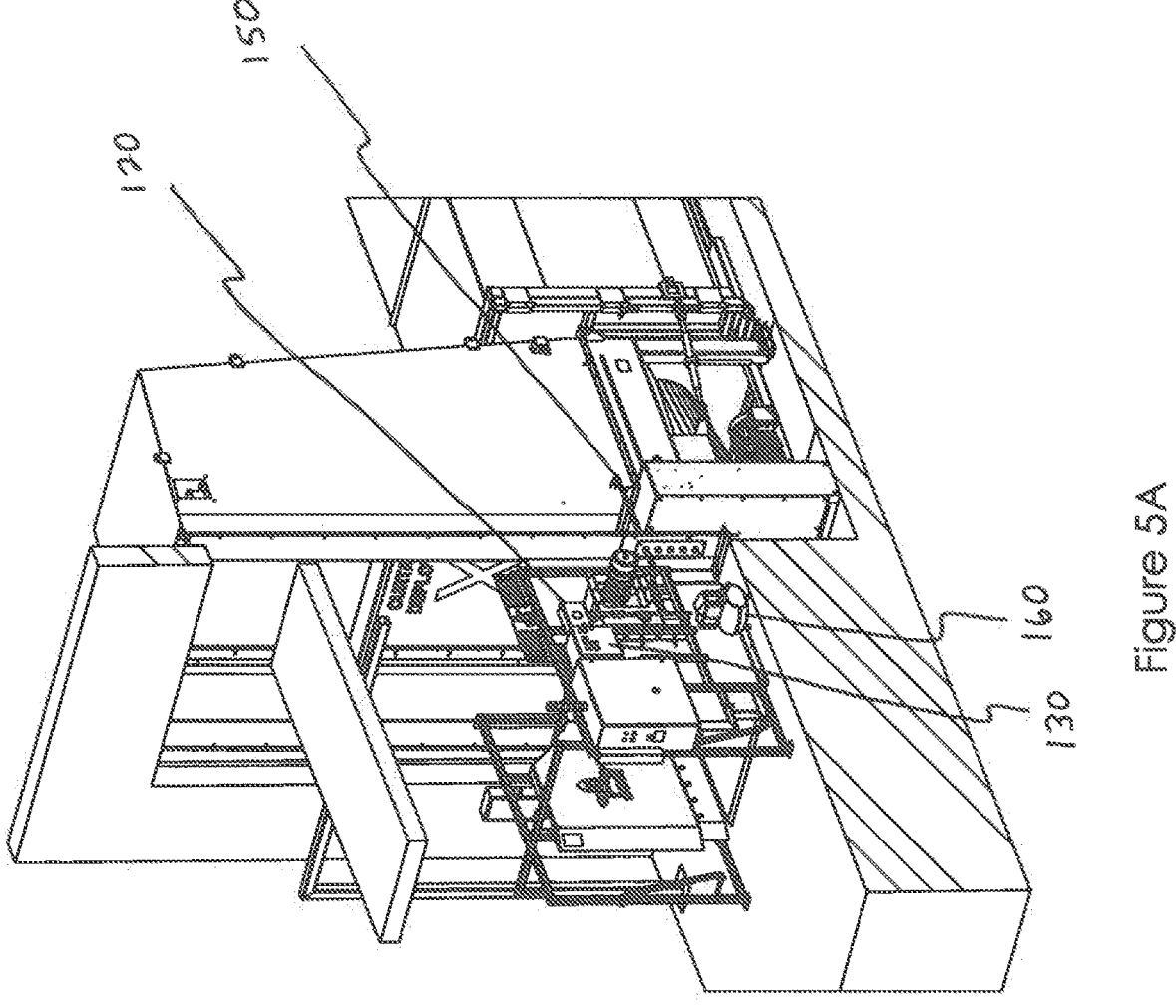
FIG. 5A is a partial sectional, perspective view of an opposite side of the auger system of FIG. 3.
Figure 5B:
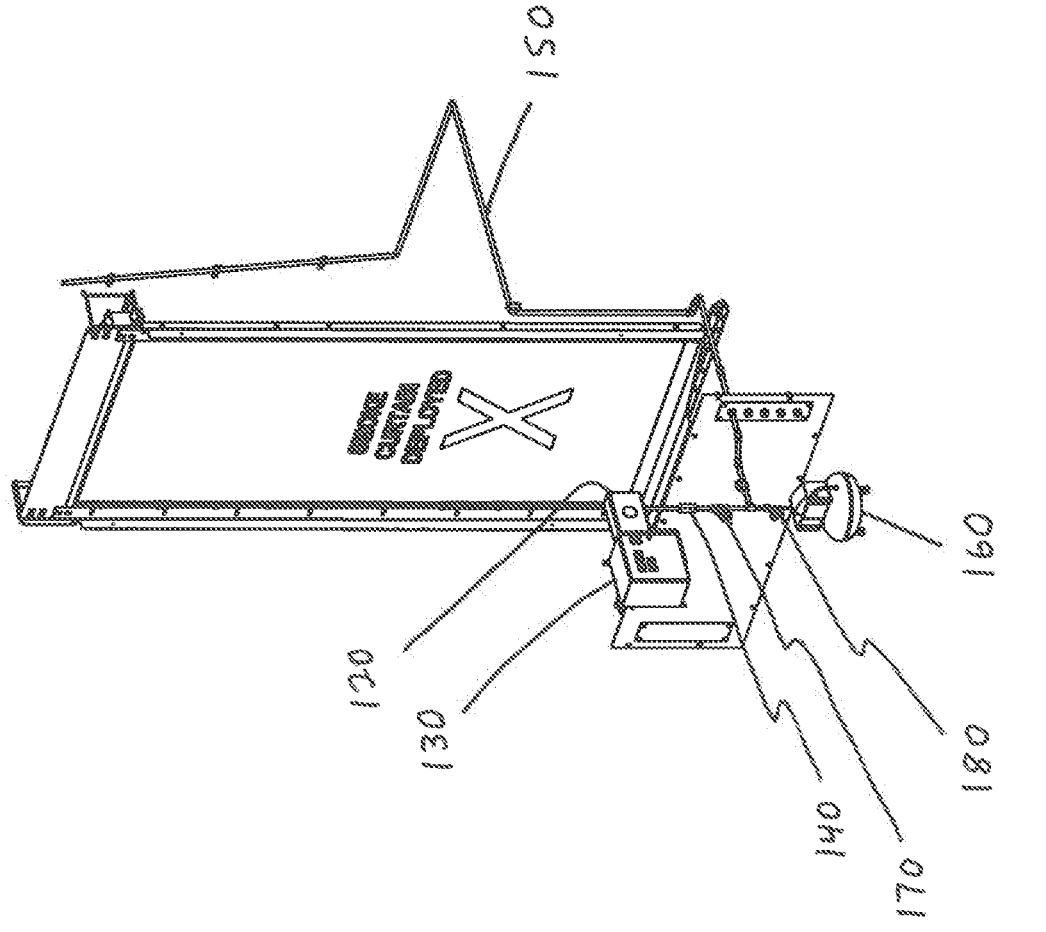
FIG. 5B is a perspective, breakout view of an exemplary embodiment of a compressor system of the auger system of FIG. 3 (wherein certain portions of the auger system are not shown for clarity).

FIGS. 5A, 5B, and 6A show an example of a compressor system that may be utilized to clear out dust or other matter build-up on or leading to any sensor(s), which could otherwise interfere with the operation of the sensor(s). In this exemplary embodiment, a smoke sensor 120 may be located adjacent to a control panel 130 for a fire curtain (or other type of door) that is associated with a filter 140. Smoke sensor 120 is adapted to substantially continuously (as addressed further below) pull a suction through piping 150 and is adapted to take at least one sample from the top of the piping 150 and/or at multiple points along the piping 150. The sample is analyzed for the presence of smoke. In particular, during operation of the auger system, the environment often contains corrugated material or other types of waste or dust that can block or otherwise interfere with the sample and require periodic maintenance of a sensor. In an exemplary embodiment, this periodic maintenance may be automated with the addition of a compressor 160. At some interval (which may be predetermined in an exemplary embodiment), a sample valve 170 for the sensor 120 that may normally be open is adapted to close and the valve 180 for the compressor 160 that may normally be closed is adapted to open such that air is adapted be blown by compressor 160 through the piping 150 to clear out any dust build-up in the piping 150 that may interfere with a sample. However, in some other exemplary embodiments, a compressor and automated pipe flushing may be an option, and some examples of a system may work without it. Also, in other embodiments, a compressor may be turned on manually or automatically at timed or other intervals. In any of these embodiments, a compressor system may be considered to comprise piping (e.g., 150), a compressor (e.g., 160) adapted to clear dust build-up in the piping, and a valve (e.g., 180) associated with compressor, wherein a smoke sensor (e.g., 120), a fire curtain/door control panel (e.g., 130), a filter (e.g., 140), and/or a sensor valve (e.g., 170) may or may not be considered to be part of the compressor system.

It is also contemplated that a compressor system may also flush other sensor(s), and/or that the configuration and placement of the aforementioned components may be different (e.g., positioned elsewhere or otherwise rearranged, have fewer or additional components, etc.) and have a same or similar functionality. For one example, a single compressor may be adapted to simultaneously or alternately purge the piping for multiple sensors. Other variations are possible. For instance, FIG. 7 shows an example of a compressor system comprising a single valve. In this example, valve 190 is associated with both compressor 200 and fire curtain/door panel 210 and its associated filter 220. Valve 190 in a first position is adapted to facilitate a flow through piping 230 to facilitate the taking of at least one sample from the top of the piping 230 and/or at multiple points along the piping 230. For example, in a first position, a smoke sensor that is associated with valve 190 may be adapted to substantially continuously (as addressed further below) pull a suction through piping 230 and may be adapted to take at least one sample from the top of the piping 230 and/or at multiple points along the piping 230. The sample is analyzed for the presence of smoke. In particular, similar to the embodiment of FIG. 6, the environment may often contain corrugated material or other types of waste or dust that can block or otherwise interfere with the sample and require periodic maintenance of a sensor. In an exemplary embodiment, this periodic maintenance may be automated with the addition of a compressor 200. At some interval (which may be predetermined in an exemplary embodiment), valve 190 is adapted to move to second position. In the second position, the aforementioned flow path created by the first position is closed, and the valve 190 is adapted to switch to another flow path such that air is adapted be blown by compressor 200 through the piping 230 to clear out any dust build-up in the piping 230 that may interfere with a sample. This single-valve embodiment may include any of the other features or alternative variations described above respect to the two-valve embodiment of FIG. 6.

Figure 6:
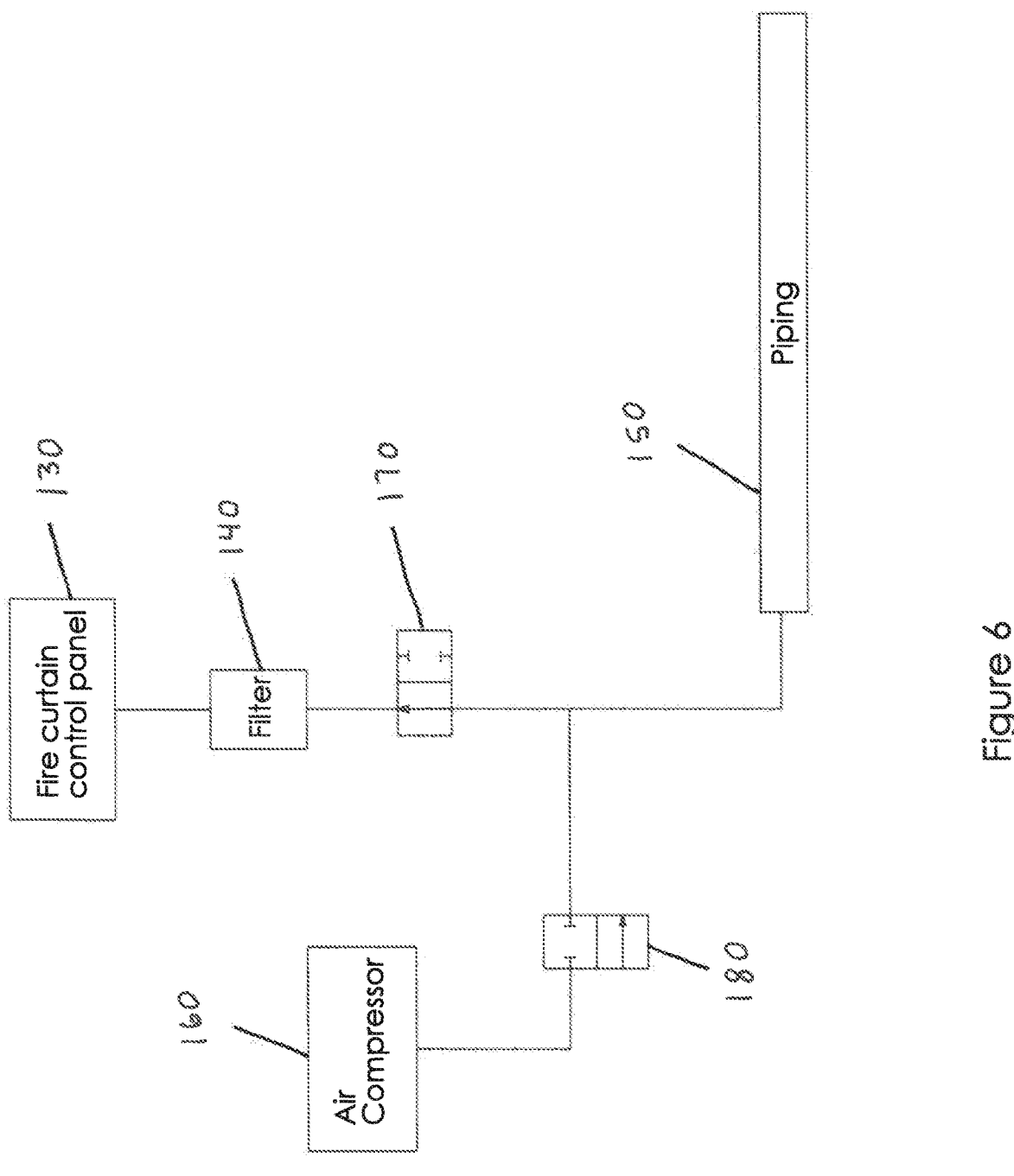
FIG. 6 is a schematic view of the compressor system of FIG. 5B.
Figure 7:
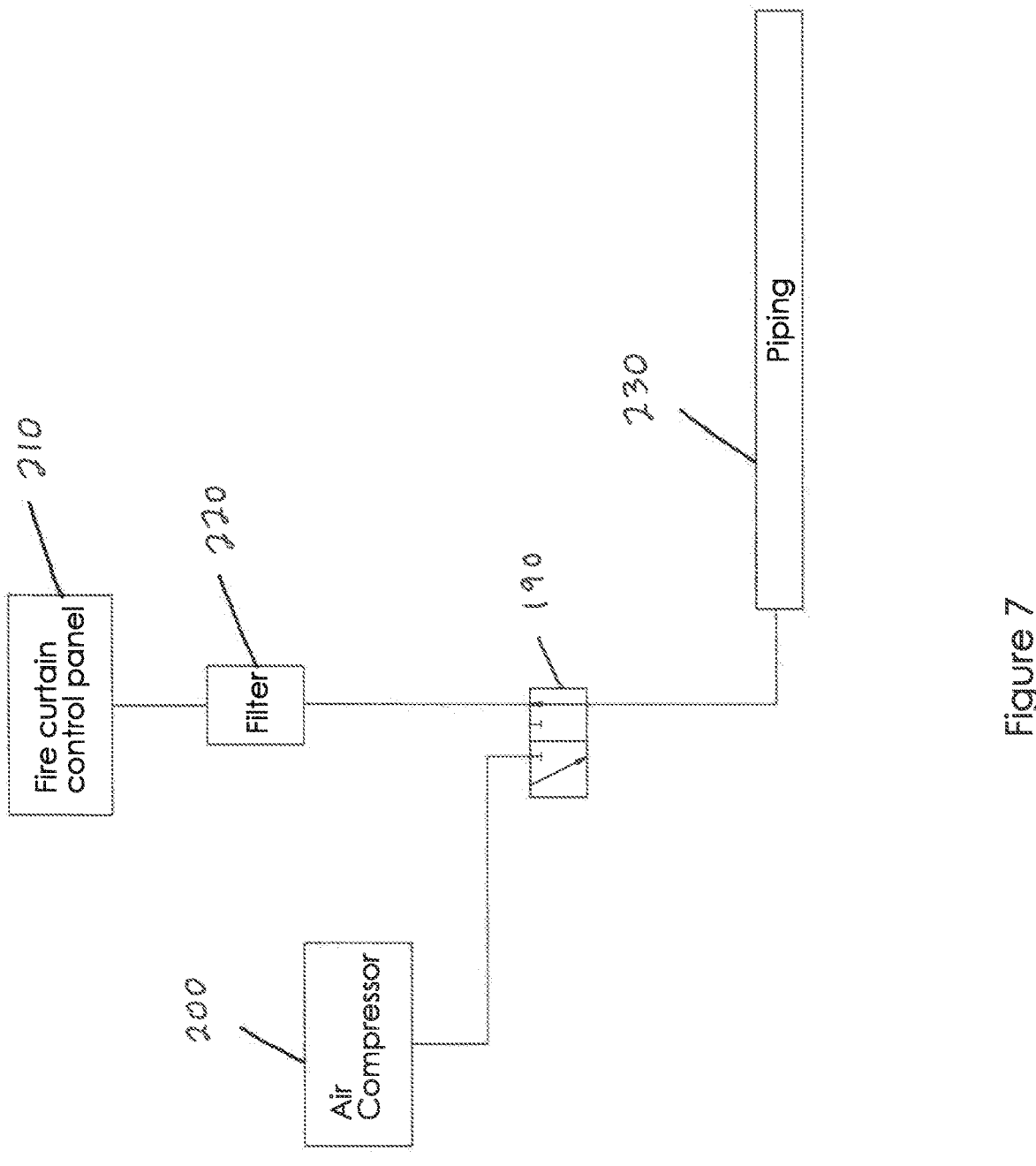
FIG. 7 is a schematic view of another exemplary embodiment of a compressor system.
Figures 8A, 8B:
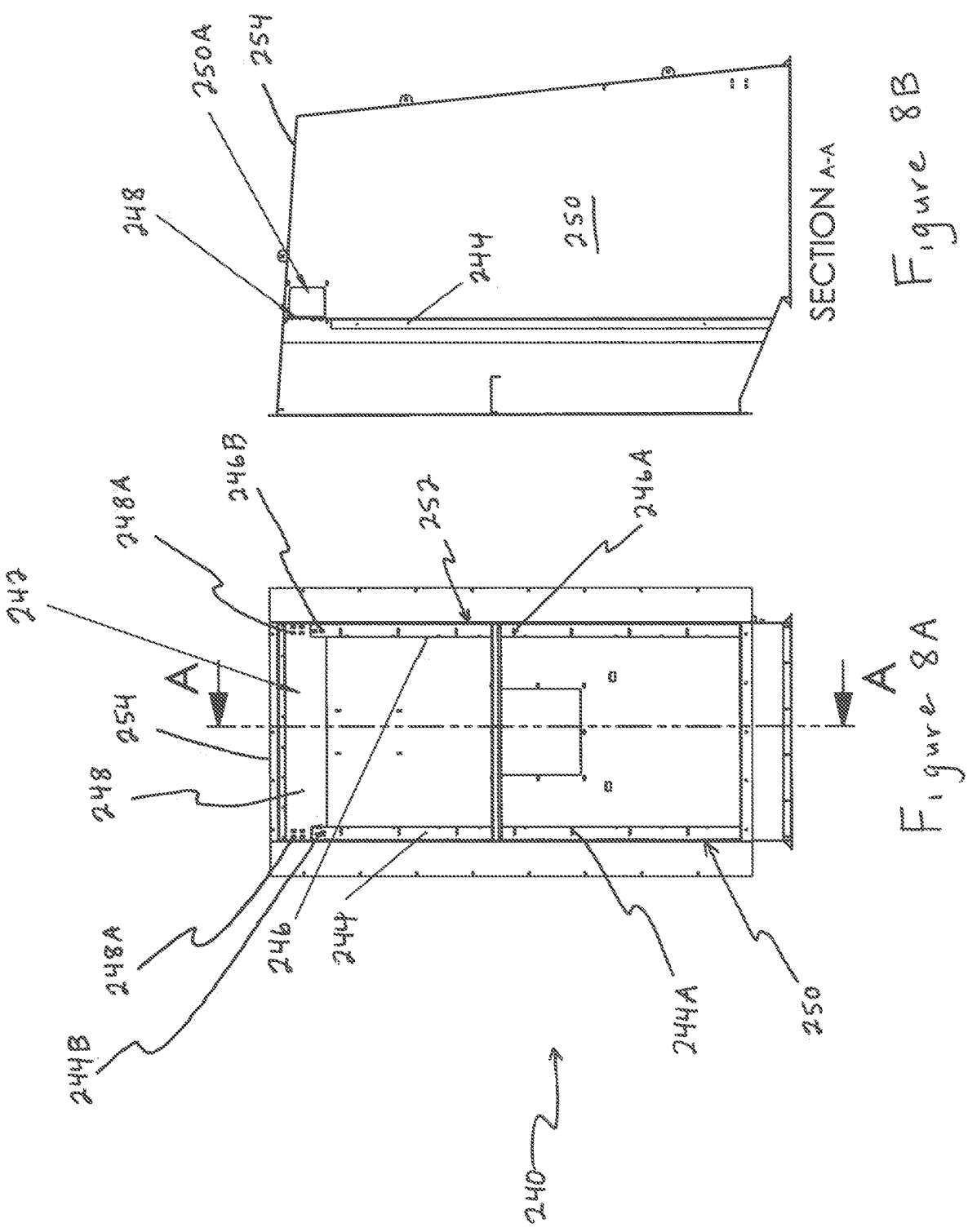
FIG. 8A is a front elevation view of an exemplary embodiment of a hopper, wherein a section line A-A is shown.
FIG. 8B is a cross-section view of the hopper of FIG. 8A along line A-A.

In the exemplary embodiments of FIGS. 6 and 7, the valves are solenoid valves to facilitate automation. However, some other exemplary embodiments may include any other suitable types of valves to facilitate the desired automatic or manual operation. Also, some other exemplary embodiments may utilize other types of devices that provide similar functionality as the aforementioned valves.

FIGS. 8A-11C show an exemplary embodiment of a hopper having features that may further enhance the implementation and maintenance of a fire curtain or other type of door. In this exemplary embodiment, hopper 240 comprises a side rail frame 242 that is adapted to facilitate the mounting, maintenance, and/or removal of a fire door (e.g., a fire curtain). Side rail frame 242 is comprised of a first side rail 244, a second side rail 246, and header plate 248. In this example, header plate 248 is connected to and extends between first side rail 244 and second side rail 246. However, some other exemplary embodiments may not comprise a header plate, or a header plate may not be directly connected to the side rails.

Side rail frame 242 may be connected to the hopper wall(s) in any suitable manner. For one example, first side rail 244 may be fixedly (e.g., welded) or removably (e.g., bolted) connected to a first hopper sidewall 250, and second side rail 246 may be fixedly (e.g., welded) or removably (e.g., bolted) connected to a second hopper sidewall 252. Similarly, header plate 248 may be fixedly (e.g., welded) or removably (e.g., bolted) connected to a top hopper sidewall 254. Additionally, a sidewall may define at least one opening (e.g., cutout) to facilitate access to and removal of an installed fire curtain or other type of door. For instance, first hopper sidewall 50 may define at least one opening 250A, and second hopper sidewall may also define at least one similar opening. However, in some other exemplary embodiments, a side rail frame may be connected to a hopper in another suitable manner.

In an exemplary embodiment, first side rail 244 and second side rail 246 are slotted to facilitate a level installation of a fire curtain or other type of door and/or to allow for variations in hopper dimensions. In this example, first side rail 244 comprises at least one slot 244A, and second side rail 246 comprises at least one slot 246A. In this example, at least one slot 244A and at least one slot 246A are substantially horizontal in this embodiment to allow for variations in hopper sidewalls, other examples of slots may have other shapes and dimensions (e.g., a vertical slot) to facilitate a desired installation (e.g., leveling) of a fire curtain or other type of door. In this example, first side rail 244 and second side rail 246 may also have additional slots for facilitating a connection of header plate 248. In particular, first side rail 244 may have at least one slot 244B, and second side rail 246 may have at least one slot 246B. However, in some exemplary embodiments, a side rail may not be slotted.

In an exemplary embodiment, header plate 248 may also be slotted to facilitate a level installation of a fire curtain or other type of door and/or to allow for variations in hopper dimensions. In this example, header plate 248 comprises at least one slot or other type of opening 248A to facilitate connection to a mounting bracket 260, which may or may not be considered to part of side rail frame 242. In an exemplary embodiment, mounting bracket 260 may also slotted or have another type opening 260A that facilitates connection to and/or adjustment of a fire curtain or other type of door.

An example of an installation of a guide rail for a fire curtain or other type of door is also shown in FIGS. 9A-11B. In an exemplary embodiment, at least one slot 244A and at least one slot 246A further ensure that proper alignment may be achieved with the guide rails of fire curtain or other type of door. As best seen in the example of FIG. 9C, at least one slot 246A of second side rail 246 facilitate an adjustable connection to mounting bracket 260. More particularly, in this exemplary embodiment, at least one slot 246A facilitates left to right adjustment of mounting bracket 260 to ensure that proper alignment may be achieved with the guide rail of a fire curtain or other type of door. First side rail 244 may have similar features as second side rail 246.

Figures 10A, 10B:
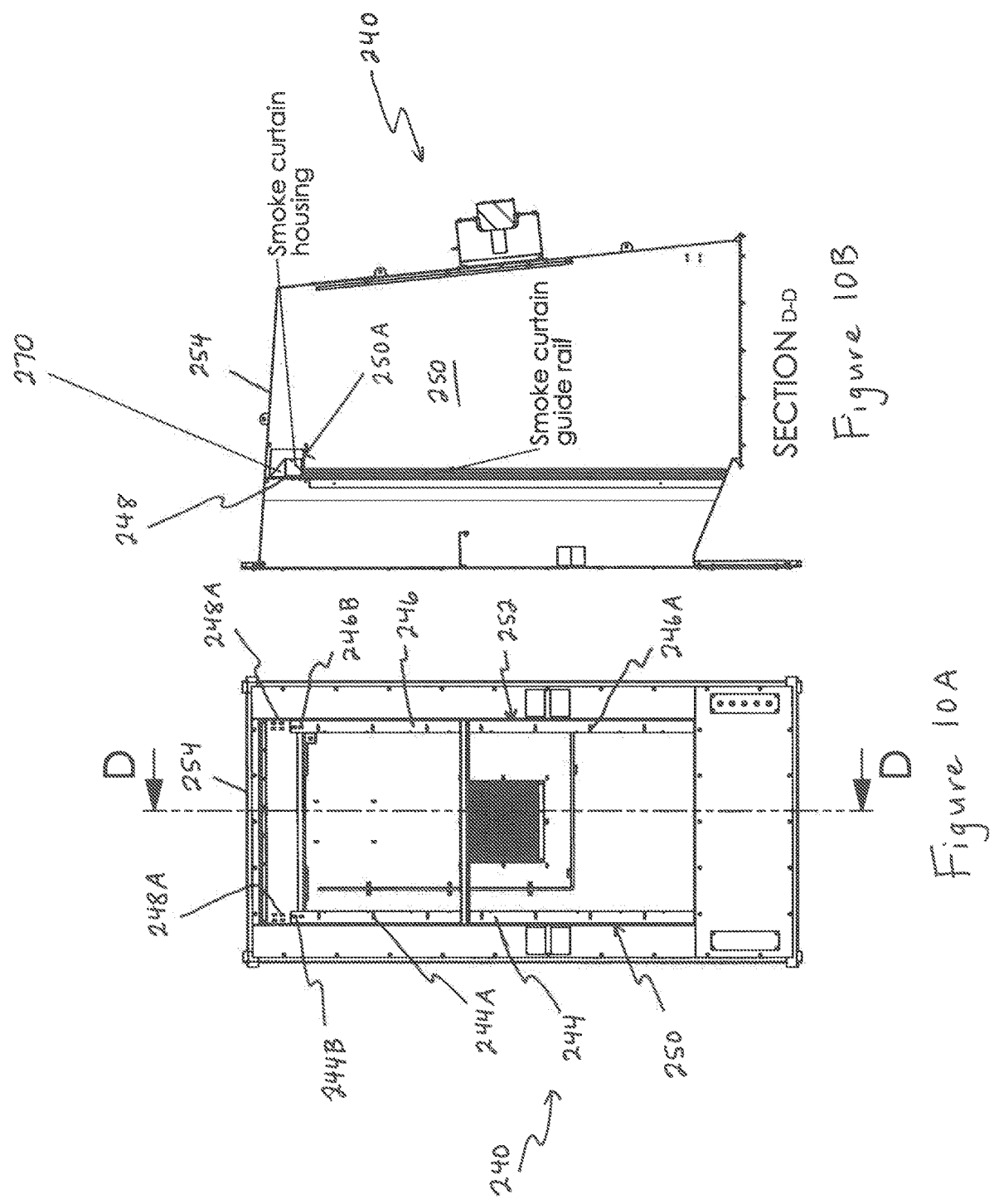
FIG. 10A is another front elevation view of the hopper of FIG. 9A, wherein a section line D-D is shown.
FIG. 10B is a cross-section view of the hopper of FIG. 10A along line D-D. A smoke curtain guide rail and a smoke curtain housing are also shown to provide an example installation.
Figures 11A, 11B, 11C:
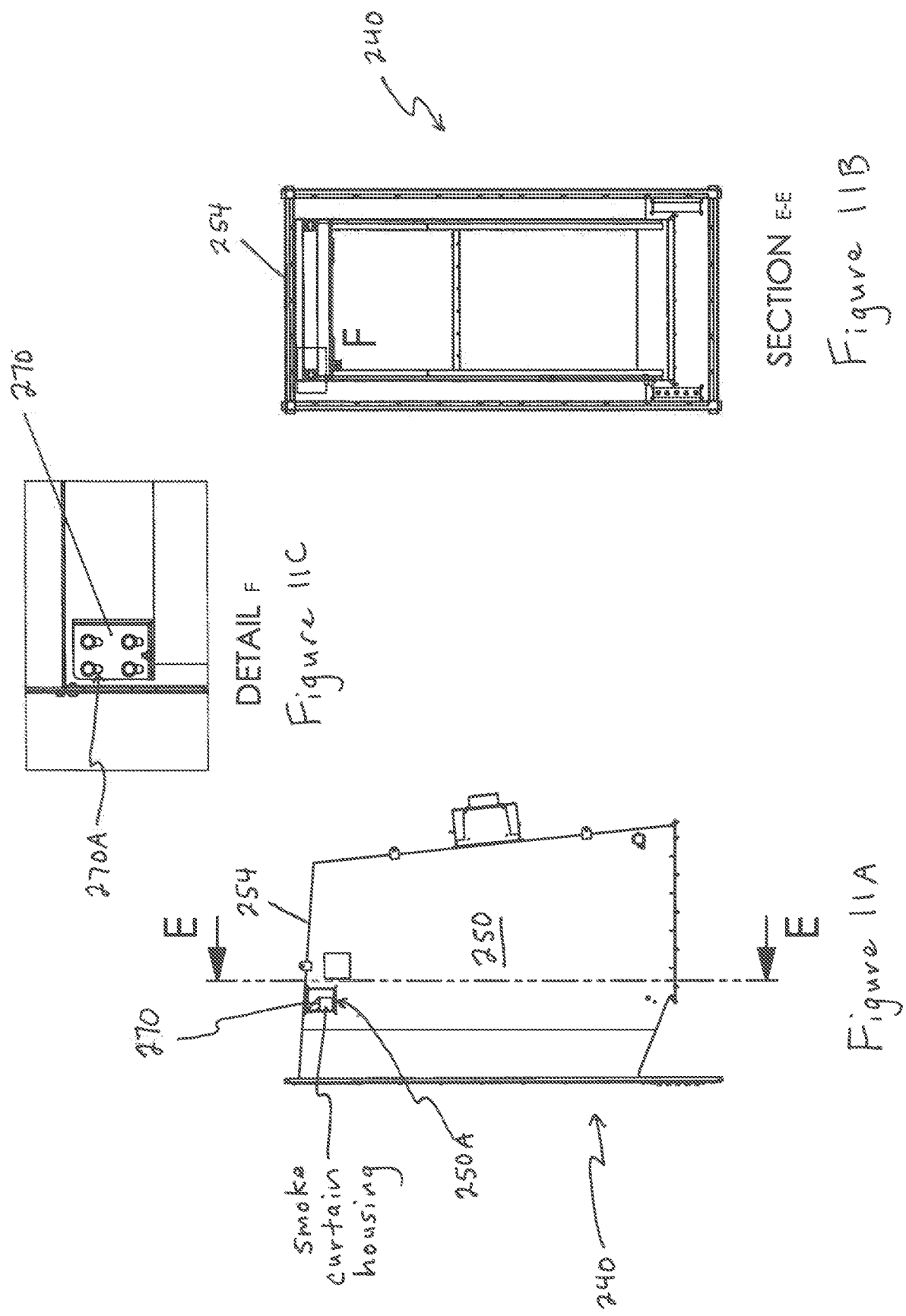
FIG. 11A is a side-elevation view of the hopper of FIG. 8A, wherein a section line E-E is shown. A smoke curtain housing is also shown to provide an example installation.
FIG. 11B is a cross-section view of the hopper of FIG. 11A along line E-E, wherein a Detail F is identified.
FIG. 11C is Detail F from FIG. 11B.

FIG. 9C further shows an example of a how mounting bracket 260 may also be connected to a guide rail or a fire curtain or other type of door. Mounting bracket 260 may be slotted or have another type of opening 260A and/or the aforementioned guide rail may be slotted or have another type of opening to ensure proper alignment. FIGS. 10B and 11C best show an example of how angle mounting bracket 270 is adapted to secure a smoke curtain (or other type of door) housing (i.e., base). In this example, angle mounting bracket 270 attaches to header plate 248 and a top of a smoke curtain housing. This exemplary embodiment of angle mounting bracket 270 is comprised of at least one vertical slot 270A adapted to facilitate level installation and mounting of a smoke curtain (or other type of door) housing (i.e., base). In another exemplary embodiment, a header plate may also or alternatively comprise at least one slot or other type of opening to facilitate level installation and mounting of a smoke curtain (or other type of door) housing (i.e., base).

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for processing material, comprising:

at least one auger;

a processing chamber in which said at least one auger is situated, a top of said processing chamber defining an opening adapted to receive material to be processed by said at least one auger, said opening at said top extending above and adjacent said at least one auger; and a hopper or chute associated with said processing chamber and adapted to direct material into said opening of said processing chamber to be processed by said at least one auger, said hopper or chute comprising at least one door that extends upward relative to said processing chamber, said at least one door adapted to move adjacent to or from a position adjacent said processing chamber between an open position adapted to allow for receipt of material into said processing chamber to be processed by said at least one auger and a closed position adapted to not allow for receipt of material into said processing chamber to be processed by said at least one auger;

wherein said door is positioned at said processing chamber at least when in said closed position such that said closed position is adapted to assist with suppression or containment of smoke or fire that may emanate in material that has been directed into said processing chamber.

2. The system of claim 1 wherein, when in said closed position, said at least one door is adapted to substantially enclose said hopper or chute with an exception of said opening of said processing chamber that is adapted to receive material to be processed when said at least one door is in said open position.

3. The system of claim 1 wherein said at least one door is adapted to move in a substantially vertical direction between said open position and said closed position.

4. The system of claim 1 wherein said at least one door is adapted to move up from said open position to said closed position.

5. The system of claim 1 wherein said at least one door is adapted to move down from said open position to said closed position.

6. The system of claim 1 wherein, when in said closed position, said at least one door is adapted to be at an angle other than 90-degrees relative to horizontal.

7. The system of claim 1 wherein said at least one door is a cloth or fabric smoke wall.

8. The system of claim 1 wherein said at least one door is a fire curtain.

9. The system of claim 1 wherein said at least one door is a slat metal fire wall.

10. The system of claim 1 further comprising at least one sensor situated in or otherwise associated with said hopper or chute or said processing chamber and adapted to detect a smoke or fire incident and initiate movement of said at least one door to said closed position.

11. A method for processing material, comprising:

providing a system comprising:

1) at least one auger;

2) a processing chamber in which said at least one auger is situated, a top of said processing chamber defining an opening adapted to receive material to be processed by said at least one auger, said opening at said top extending above and adjacent said at least one auger; and 3) a hopper or chute associated with said processing chamber and adapted to direct material into said opening of said processing chamber to be processed by said at least one auger, said hopper or chute comprising at least one door that extends upward relative to said processing chamber, said at least one door adapted to move adjacent to or from a position adjacent said processing chamber between an open position adapted to allow for receipt of material into said processing chamber to be processed by said at least one auger and a closed position adapted to not allow for receipt of material into said processing chamber to be processed by said at least one auger;

directing material into said hopper or chute and to said processing chamber when said at least one door is in said open position; and moving said at least one door into said closed position to assist with suppression or containment of smoke or fire that may emanate in said material that has been directed into said processing chamber;

wherein said door is positioned at said processing chamber at least when in said closed position.

12. The method of claim 11 wherein, in said closed position, said at least one door substantially encloses said hopper or chute with an exception of said opening of said processing chamber that is adapted to receive material to be processed when said at least one door is in said open position.

13. The method of claim 11 wherein said at least one door moves in a substantially vertical direction between said open position and said closed position.

14. The method of claim 11 wherein said at least one door moves up from said open position to said closed position.

15. The method of claim 11 wherein said at least one door moves down from said open position to said closed position.

16. The method of claim 11 wherein, in said closed position, said at least one door is at an angle other than 90-degrees relative to horizontal.

17. The method of claim 11 wherein said at least one door is a cloth or fabric smoke wall.

18. The method of claim 11 wherein said at least one door is a fire curtain.

19. The method of claim 11 wherein said at least one door is a slat metal fire wall.

20. The method of claim 11 wherein said system further comprises at least one sensor situated in or otherwise associated with said hopper or chute or said processing chamber and adapted to detect a smoke or fire incident and initiate said moving of said at least one door to said closed position.

* * * * *